United States Patent
Okada et al.

(10) Patent No.: US 10,954,332 B2
(45) Date of Patent: Mar. 23, 2021

(54) METHOD FOR PRODUCING OXYMETHYLENE COPOLYMER

(71) Applicant: MITSUBISHI GAS CHEMICAL COMPANY, INC., Tokyo (JP)

(72) Inventors: Takuya Okada, Mie (JP); Daisuke Sunaga, Mie (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/764,479

(22) PCT Filed: Jul. 16, 2019

(86) PCT No.: PCT/JP2019/027842
§ 371 (c)(1),
(2) Date: May 15, 2020

(87) PCT Pub. No.: WO2020/026781
PCT Pub. Date: Feb. 6, 2020

(65) Prior Publication Data
US 2020/0354500 A1    Nov. 12, 2020

(30) Foreign Application Priority Data

Aug. 1, 2018 (JP) .................. 2018-144711

(51) Int. Cl.
*C08G 2/10* (2006.01)
(52) U.S. Cl.
CPC ..................... *C08G 2/10* (2013.01)
(58) Field of Classification Search
CPC .......................................... C08G 2/10
USPC ........................................ 524/258
See application file for complete search history.

(56) References Cited

U.S. PATENT DOCUMENTS

| 4,045,415 A * | 8/1977 | Sextro .................. B01J 19/0013 528/232 |
| 2008/0097077 A1 | 4/2008 | Assmann et al. |
| 2015/0112018 A1 | 4/2015 | Nakaya et al. |
| 2016/0102190 A1 | 4/2016 | Ito et al. |
| 2016/0168324 A1 | 6/2016 | Okui et al. |
| 2018/0118885 A1 | 5/2018 | Okui et al. |
| 2020/0055974 A1 | 2/2020 | Takahashi et al. |

FOREIGN PATENT DOCUMENTS

| EP | 3018159 A1 | 5/2016 |
| EP | 3239201 A1 | 11/2017 |
| JP | 11-5822 | 1/1999 |
| JP | 2008-533265 | 8/2008 |
| JP | 2011-137087 | 7/2011 |
| WO | 2013/172270 | 11/2013 |
| WO | 2014/189139 | 11/2014 |
| WO | 2015/005169 | 1/2015 |
| WO | 2018/084281 | 5/2018 |
| WO | 2019/053976 | 3/2019 |

OTHER PUBLICATIONS

International Search Report issued in International Patent Application No. PCT/JP2019/027842, dated Oct. 15, 2019.
Extended European Search Report issued with respect to corresponding Application No. 19844432.5, dated Dec. 18, 2020.

* cited by examiner

*Primary Examiner* — Hui H Chin
(74) *Attorney, Agent, or Firm* — Greenblum & Bernstein, P.L.C.

(57) ABSTRACT

A method for producing an oxymethylene copolymer which gives molded articles that are inhibited from emitting formaldehyde and can be reduced in yellowness is provided. In producing an oxymethylene copolymer, an effective polymerization initiator amount is regulated to a value within a given range, the amount being calculated from the amount of perchloric acid or a derivative thereof contained in the polymerization initiator and the amount of triethanolamine contained in all the monomers comprising trioxane and comonomers, which are starting materials for the copolymer.

9 Claims, No Drawings

मेटहोड FOR PRODUCING OXYMETHYLENE COPOLYMER

METHOD FOR PRODUCING OXYMETHYLENE COPOLYMER

TECHNICAL FIELD

The present invention relates to a method for producing an oxymethylene copolymer.

BACKGROUND ART

Oxymethylene copolymers (polyacetal) have excellent mechanical, chemical, physical and electrical characteristics and therefore are widely used in various industrial fields. In general, oxymethylene copolymers are produced by polymerizing trioxane and a comonomer such as alkylene oxide and cyclic formal using an acidic polymerization initiator (acid catalyst).

As a polymerization initiator for oxymethylene copolymers, a boron fluoride-based compound is widely used. However, use of the boron fluoride-based compound has problems. For example, since a relatively large amount of a polymerization initiator is required in this case, the polymerization degree of a polymer obtained is limited, and in addition, since a side reaction tends to proceed and there are many unstable end portions, a complicated stabilization step is required.

Japanese Laid-Open Patent Publication No. H11-005822 proposes a method for producing a polyacetal copolymer, wherein a mixed solution obtained by mixing at least a part of a comonomer or the whole comonomer with a perchloric acid-based polymerization catalyst is added to trioxane to be copolymerized.

SUMMARY OF THE INVENTION

Problem to be Solved by the Invention

However, there are a problem of generation of an odor due to generation of formaldehyde from molded articles of oxymethylene copolymers obtained according to the above-described method and a problem of yellowness of such molded articles of oxymethylene copolymers.

Under such circumstances, the present invention aims to provide a method for producing an oxymethylene copolymer, wherein the amount of generation of formaldehyde from a molded article of the oxymethylene copolymer can be reduced and yellowness of the molded article can also be reduced.

Means for Solving the Problem

The present inventors diligently made researches in order to solve the above-described problems and found that it can be solved by adjusting an effective polymerization initiator amount, which is calculated from an amount of perchloric acid contained in a polymerization initiator used and an amount of triethanolamine in a copolymer starting material, within a predetermined range in a method for producing an oxymethylene copolymer, and thus the present invention was achieved.

Specifically, the present invention is as described below.
<1> A method for producing an oxymethylene copolymer, including:
a step 1 in which a polymerization initiator (A) containing perchloric acid or a derivative thereof is prepared;
a step 2 in which a copolymer starting material (C) containing trioxane and a comonomer, the copolymer starting material (C) being obtained by mixing the polymerization initiator (A) prepared in the step 1 and a composition (B) containing trioxane, is subjected to a polymerization reaction at 65° C. to 125° C.; and
a step 3 in which a polymerization terminator (D) is added to a product obtained in the step 2 to obtain a crude oxymethylene copolymer, wherein:
the copolymer starting material (C) contains triethanolamine in an amount of $0.048 \times 10^{-6}$ mol to $0.25 \times 10^{-6}$ mol relative to 1 mol of all monomers that are the total of said trioxane and comonomer; and
when the difference between the amount X of perchloric acid per 1 mol of all the monomers (mol/mol) and the amount Y of triethanolamine per 1 mol of all the monomers (mol/mol) is regarded as an effective polymerization initiator amount Z (mol/mol) and defined by formula (1) below, the effective polymerization initiator amount Z in the copolymer starting material (C) is from greater than 0 to $0.2 \times 10^{-6}$.

$$Z = X - Y \quad (1)$$

<2> The method according to item <1>, wherein the polymerization initiator (A) contains a comonomer.
<3> The method according to item <1> or <2>, wherein the composition (B) contains a comonomer.
<4> The method according to any one of items <1> to <3>, wherein the polymerization initiator (A) contains an organic solvent.
<5> The method according to any one of items <1> to <4>, wherein the concentration of said perchloric acid in the polymerization initiator (A) is $1.0 \times 10^{-3}$ mol/kg to $1.0 \times 10^{-2}$ mol/kg.
<6> The method according to any one of items <1> to <5>, wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal and 1,6-hexanediol formal.
<7> The method according to any one of items <1> to <6>, wherein the polymerization terminator (D) is at least one selected from the group consisting of a trivalent organophosphorous compound, an amine compound, and a hydroxide of an alkali metal or an alkaline earth metal.
<8> The method according to any one of items <1> to <7>, further including a step 4 in which an antioxidant and a base are added to the crude oxymethylene copolymer obtained in the step 3 and melt-kneaded.
<9> A method for producing an oxymethylene copolymer, including:
a step 1 in which a polymerization initiator (A) containing perchloric acid or a derivative thereof is prepared;
a step 2 in which a copolymer starting material (C) containing trioxane and a comonomer, the copolymer starting material (C) being obtained by mixing the polymerization initiator (A) prepared in the step 1 and a composition (B) containing trioxane, is subjected to a polymerization reaction at 65° C. to 125° C.; and
a step 3 in which a polymerization terminator (D) is added to a product obtained in the step 2 to obtain a crude oxymethylene copolymer, wherein:
the copolymer starting material (C) contains triethanolamine in an amount of $1.0 \times 10^{-8}$ mol to $3.0 \times 10^{-7}$ mol relative to 1 mol of the trioxane; and
when the difference between the amount X of perchloric acid per 1 mol of all monomers (mol/mol) and the amount Y of triethanolamine per 1 mol of all the monomers (mol/mol) is regarded as an effective polymerization initiator amount Z (mol/mol) and defined by formula (1) below, the effective polymerization initiator amount Z in the copolymer starting material (C) is from greater than 0 to $0.2 \times 10^{-6}$.

$$Z=X-Y \tag{1}$$

Effect of the Invention

Regarding molded articles of the oxymethylene copolymer produced by the production method of the present invention, the generation of formaldehyde is reduced and yellowness of the molded articles is reduced. Further, even when the molded articles of the oxymethylene copolymer produced by the production method of the present invention are stored under a hot and humid environment for a long period of time, the amount of formaldehyde generated from the molded articles is reduced, the generation of an odor is suppressed and yellowness is reduced.

DETAILED DESCRIPTION OF THE INVENTION

Hereinafter, the present invention will be described in detail. The method for producing an oxymethylene copolymer of the present invention includes: a step 1 in which a polymerization initiator (A) containing perchloric acid or a derivative thereof is prepared; a step 2 in which a copolymer starting material (C) containing trioxane and a comonomer, the copolymer starting material (C) being obtained by mixing the polymerization initiator (A) prepared in the step 1 and a composition (B) containing trioxane, is subjected to a polymerization reaction at 65° C. to 125° C.; and a step 3 in which a polymerization terminator (D) is added to a product obtained in the step 2 to obtain a crude oxymethylene copolymer. In addition, the copolymer starting material (C) contains triethanolamine in an amount of $0.048 \times 10^{-6}$ mol to $0.25 \times 10^{-6}$ mol relative to 1 mol of all monomers that are the total of said trioxane and comonomer, and when the difference between the amount X of perchloric acid per 1 mol of all the monomers (mol/mol) and the amount Y of triethanolamine per 1 mol of all the monomers (mol/mol) is regarded as an effective polymerization initiator amount Z (mol/mol) and defined by formula (1) below, the effective polymerization initiator amount Z is from greater than 0 to $0.2 \times 10^{-6}$.

$$Z=X-Y \tag{1}$$

<<Oxymethylene Copolymer>>

Firstly, the oxymethylene copolymer obtained by the method for producing the oxymethylene copolymer of the present invention will be described. The oxymethylene copolymer of the present invention is a copolymer obtained by carrying out the above-described steps 1-3 and usually a high-molecular-weight compound containing an oxymethylene group (—OCH2–) and an oxyalkylene group having 2 or more carbon atoms as structural units. The oxyalkylene group having 2 or more carbon atoms is not particularly limited, and examples thereof include an oxyethylene (—OCH2CH2—) group, an oxypropylene (—OCH(CH$_3$)CH$_2$—) group and an oxybutylene (—OCH$_2$CH$_2$CH$_2$CH$_2$—) group. Among them, the oxyethylene group (—OCH$_2$CH$_2$—) is particularly preferred as the oxyalkylene group having 2 or more carbon atoms.

<Trioxane>

Trioxane (also referred to as "1,3,5-trioxane") is a cyclic trimer of formaldehyde. The trioxane that can be used for the production of the oxymethylene copolymer of the present invention is not particularly limited as long as it is a cyclic trimer of formaldehyde, and it may be either a commercial product or a product produced by a conventionally known production method. Further, the method for producing the trioxane is not particularly limited. The trioxane may contain an amine as a stabilizer as long as a polymerization reaction is not significantly inhibited thereby. The content of the amine as a stabilizer is usually $1.0 \times 10^{-8}$ mol to $3.0 \times 10^{-6}$ mol, preferably $1.0 \times 10^{-8}$ mol to $5.0 \times 10^{-7}$ mol, and particularly preferably $1.0 \times 10^{-8}$ mol to $3.0 \times 10^{-7}$ mol per 1 mol of the trioxane.

The amine to be added as a stabilizer is not particularly limited, and examples thereof include an amine compound having an alcoholic hydroxyl group in the molecule such as a primary amine, a secondary amine, a tertiary amine and triethanolamine. In this regard, the alcoholic hydroxyl group means a hydroxyl group directly binding to a carbon atom that is other than those in an aromatic hydrocarbon and a carbonyl group. Among them, triethanolamine is preferred. When using triethanolamine, it is contained in an amount of $0.048 \times 10^{-6}$ mol to $0.25 \times 10^{-6}$ mol, $0.048 \times 10^{-6}$ mol to $0.238 \times 10^{-6}$ mol, $0.048 \times 10^{-6}$ mol to $0.191 \times 10^{-6}$ mol, or $0.086 \times 10^{-6}$ mol to $0.191 \times 10^{-6}$ mol relative to 1 mol of all monomers that are the total of the trioxane and a comonomer as raw materials of the oxymethylene copolymer.

There is a case where trioxane contains water, formic acid, methanol and formaldehyde as impurities inevitably generated in the industrial production, but such a trioxane containing these impurities may also be used. In this case, the total amount of water, formic acid, methanol and formaldehyde in the trioxane is preferably 500 mass ppm or less, more preferably 450 mass ppm or less, and particularly preferably 400 mass ppm or less. Among them, the content of water is preferably 200 mass ppm or less, more preferably 100 mass ppm or less, and particularly preferably 50 mass ppm or less.

<Comonomer>

The comonomer is not particularly limited as long as an oxyalkylene group having 2 or more carbon atoms as a structural unit can be introduced into the oxymethylene copolymer thereby, and examples thereof include a cyclic ether, a glycidyl ether compound, and a cyclic formal. Among them, preferred is at least one selected from the group consisting of comonomers having 2 to 10 carbon atoms including: cyclic ethers such as ethylene oxide, propylene oxide, butylene oxide, styrene oxide and 1,3-dioxolane; glycidyl ether compounds such as methyl glycidyl ether, ethyl glycidyl ether, butyl glycidyl ether and phenyl glycidyl ether; and cyclic formals such as propylene glycol formal, diethylene glycol formal, triethylene glycol formal, 1,4-butanediol formal, 1,5-pentanediol formal and 1,6-hexanediol formal. Among them, ethylene oxide, 1,3-dioxolane, diethylene glycol formal, and 1,4-butanediol formal are preferred, and 1,3-dioxolane is particularly preferred. The aforementioned comonomers may be used solely, or two or more of them may be used in combination. The comonomer is used for constituting an oxyalkylene group having 2 or more carbon atoms in the oxymethylene copolymer.

The content of the comonomer in polymerization starting materials is usually 0.5 to 50 parts by mass, preferably 0.5 to 30 parts by mass, and particularly preferably 0.5 to 15 parts by mass relative to 100 parts by mass of the trioxane.

<<Method for Producing Oxymethylene Copolymer>>

Next, the method for producing the oxymethylene copolymer of the present invention will be described in detail.
(Step 1: Step of Preparing Polymerization Initiator (A))

The method for producing the oxymethylene copolymer of the present invention includes a step 1 in which a polymerization initiator (A) containing perchloric acid or a derivative thereof is prepared. The method for preparing the polymerization initiator (A) is not particularly limited as long as components described below can be mixed together.

<Polymerization Initiator (A)>

The polymerization initiator (A) contains perchloric acid or a derivative thereof as an essential component. As optional components, an organic solvent and the above-described comonomer may be contained therein.

<Perchloric Acid or Derivative thereof>

Examples of the perchloric acid or derivative thereof include, but are not limited to, perchloric acid aqueous solution, perchloric anhydride and acetyl perchlorate. These materials may be used solely, or two or more of them may be used in combination.

The amount of the perchloric acid or derivative thereof (hereinafter, the perchloric acid or derivative thereof is also referred to as "acid catalyst") to be used is $1.0 \times 10^{-8}$ mol to $5.0 \times 10^{-6}$ mol, preferably $3.0 \times 10^{-8}$ mol to $2.0 \times 10^{-6}$ mol, and particularly preferably $5.0 \times 10^{-8}$ mol to $1.0 \times 10^{-6}$ mol relative to 1 mol of all the monomers that are the total of the trioxane and the comonomer. When the amount of the acid catalyst to be used is set to be equal to or lower than the upper limit of the above-described range, the amounts of a hemiacetal end group (—O—$CH_2$—OH) which tends to be thermally decomposed, a formate end group (—O—CH=O) which tends to be hydrolyzed, etc. in the oxymethylene copolymer obtained become smaller, and in addition, the acid catalyst is more easily deactivated and when heated, a depolymerization reaction is not easily caused. Meanwhile, when the amount of the acid catalyst to be used is set to be equal to or higher than the lower limit of the above-described range, the loss of the trioxane due to insufficient progress of a polymerization reaction can be reduced, and in addition, since energy required for separation of unreacted trioxane from a product (oxymethylene copolymer) and recovery of unreacted trioxane can be reduced, it is economically advantageous.

Examples of the organic solvent include, but are not limited to, an aromatic organic solvent such as benzene and toluene and an oxygen-containing organic solvent such as acetone, methyl formate, butyl acetate and n-butyl ether. These materials may be used solely, or two or more of them may be used in combination. Among them, benzene is preferably used from the viewpoint of stability, but since perchloric acid is generally a 60-70% aqueous solution, it is not homogeneously dispersed in benzene. For this reason, it is preferred to further use acetone to be mixed therewith as a polar solvent. That is, it is preferred to use a mixed solvent of benzene and acetone as a diluent solvent of perchloric acid. The blending ratio thereof is not particularly limited, but 1 to 20% by mass of acetone and 99 to 80% by mass of benzene are preferred, and 5 to 15% by mass of acetone and 95 to 85% by mass of benzene are more preferred.

The concentration of the perchloric acid or derivative thereof in the polymerization initiator (A) is not limited, but from the viewpoint of performing a homogeneous polymerization reaction, the concentration is preferably 0.0001 mol/kg to 0.1 mol/kg, more preferably 0.0005 mol/kg to 0.05 mol/kg, and particularly preferably 0.001 mol/kg to 0.01 mol/kg.

The polymerization initiator (A) may contain the comonomer. When the polymerization initiator (A) contains the comonomer, the amount of the aforementioned organic solvent can be reduced and it is economically advantageous.

The concentration of the comonomer is not limited, but from the viewpoint of the dispersibility of the polymerization initiator (A) in the composition (B) containing trioxane, the concentration is preferably 10 parts by mass to 10000 parts by mass, and more preferably 100 parts by mass to 1000 parts by mass relative to 100 parts by mass of the total of the perchloric acid or derivative thereof.

(Step 2: Polymerization Reaction Step)

In the step 2, a copolymer starting material (C) containing trioxane and the comonomer obtained by mixing the polymerization initiator (A) obtained in the step 1 and a composition (B) containing trioxane is subjected to a polymerization reaction at 65° C. to 125° C. Since the step 2 is carried out using a bulk polymerization process in a slightly pressurized state relative to atmospheric pressure, when the polymerization temperature is set at higher than 125° C., trioxane as a raw material volatilizes. For this reason, in the step 2, the polymerization reaction is performed at 125° C. or lower.

<Composition (B) Containing Trioxane>

As the composition (B), trioxane may be used solely, but a molecular weight control agent may be added to the composition (B) in order to adjust the molecular weight of the oxymethylene copolymer obtained. The type of the molecular weight control agent is not particularly limited, and examples thereof include methylal, methoxymethylal, dimethoxymethylal, trimethoxymethylal and oxymethylene di-n-butyl ether. Among them, methylal is preferred. The amount of the molecular weight control agent to be added is adjusted within a range of 0% by mass to 0.5% by mass relative to the total mass of trioxane and the comonomer in the copolymer starting material (C) depending on the desired molecular weight of the oxymethylene copolymer.

The composition (B) may contain the comonomer. When the composition (B) contains the comonomer, it is possible to disperse the comonomer in trioxane in advance. The concentration of the comonomer is not limited, but from the viewpoint of the polymerization reaction efficiency, the amount of the comonomer to be used is preferably 0.01 part by mass to 30 parts by mass, and more preferably 0.1 part by mass to 15 parts by mass relative to 100 parts by mass of trioxane to be used.

The method for blending the comonomer is not limited, and in addition to the method in which it is contained in the polymerization initiator (A) and the method in which it is contained in the composition (B), a method in which it is mixed in the polymerization initiator (A) and the composition (B) may also be employed. Further, these methods may be used in combination.

(Step 3: Polymerization Termination Step)

In the step 3, a polymerization terminator (D) is added to a product obtained in the step 2 to obtain a crude oxymethylene copolymer.

<Polymerization Terminator (D)>

As a polymerization terminator (D), compounds of triphenylphosphine, diethylamine, triethylamine, tributylamine, triethanolamine, N-methyldiethanolamine, etc. publicly known as deactivators may be used. Specifically, N,N-diethylhydroxylamine, N-isopropylhydroxylamine, N,N-bisoctadecylhydroxylamine, and N,N-dibenzylhydroxylamine are preferred, and N,N-diethylhydroxylamine, N,N-bisoctadecylhydroxylamine, and N,N-dibenzylhydroxylamine are more preferred. Among them, N,N-diethylhydroxylamine is particularly preferred because it is easily obtained and has excellent characteristics in which the amount of generation of formaldehyde from products, in particular, the amount of generation of formaldehyde from products stored under a hot, and humid environment for a long period of time is reduced and a mold deposit is less generated at the time of molding.

(Step 4: Stabilization Step)

In the production method of the present invention, by carrying out stabilization after the steps 1-3, an oxymethylene copolymer having more excellent thermal stability can be obtained. In the step 4 as a stabilization step, an antioxidant and a base are added to the crude oxymethylene copolymer obtained in the step 3 and melt-kneaded, thereby further deactivating the polymerization initiator used in the step 3 contained in the crude oxymethylene copolymer. Further, in the step 4, by performing devolatilization under reduced pressure using a vacuum pump or the like, while deactivating the polymerization initiator, trioxane and comonomer derived from unreacted starting materials and the hemiacetal end group are decomposed and formaldehyde generated therefrom is devolatilized and removed to carry out stabilization, thereby obtaining a thermally-stable oxymethylene copolymer.

<Antioxidant>

As an antioxidant, a general antioxidant to be used for oxymethylene copolymers can be used.

<Base>

Examples of the base which can be used include amine-substituted triazines such as melamine, methylol melamine, benzoguanamine, cyanoguanidine and N,N-diarylmelamine, polyamides, urea derivatives, hydrazine derivatives, urethanes, and hydroxides, inorganic acid salts, fatty acid salts and alkoxides of sodium, alkali metals or alkaline earth metals, and minerals (e.g., hydrotalcite).

EXAMPLES

Hereinafter, embodiments and effects of the present invention will be specifically described by way of working examples and comparative examples, but the present invention is not limited to these examples.

Examples 1-11 and Comparative Example 1

<Step 1: Step of Preparing Polymerization Initiator>

Perchloric acid (70% by mass aqueous solution) was mixed with an organic solvent (10% by mass of acetone and 90% by mass of benzene) to prepare a polymerization initiator having a perchloric acid concentration of 0.0015 mol/kg.

<Step 2: Production of Crude Oxymethylene Copolymer>

Trioxane containing triethanolamine, 1,3-dioxolane as a comonomer, the above-described polymerization initiator, and a benzene solution of methylal as a molecular weight control agent (the concentration of methylal: 33% by mass) were continuously added in a biaxial continuous polymerization machine having a self-cleaning type paddle with its temperature being set at 85° C. The blending amounts of the respective components were those described in Table 1. A polymerization reaction was continuously performed in a manner such that the residence time of a polymerization reaction product in the continuous polymerization machine was 15 minutes, thereby obtaining the polymerization reaction product. Note that the step 2 was carried out using the bulk polymerization process in a slightly pressurized state (0.1 kPa to 0.5 kPa) relative to atmospheric pressure.

<Step 3: Polymerization Termination Step>

A benzene solution of N,N-diethylhydroxylamine as a polymerization terminator (the concentration of the polymerization terminator: 1.0 mol/kg) was added to the polymerization reaction product whose residence time in the continuous polymerization machine became 15 minutes, and then the mixture was pulverized to obtain a crude oxymethylene copolymer.

<Step 4: Stabilization Step>

To 100 parts by mass of the crude oxymethylene copolymer, 0.3 part by mass of ethylenebis(oxyethylene) bis[3-(5-tert-butyl-4-hydroxy-m-tolyl)propionate as a stabilizer (IRGANOX (registered trademark) 245, manufactured by BASF), 0.1 part by mass of melamine (manufactured by Mitsui Chemicals, Inc.) and 0.0002 part by mass of 2,5-bis (5'-t-butylbenzoxazol-2'-yl)thiophene as a fluorescent brightener (TINOPAL (registered trademark) OB, manufactured by BASF) were added, and the mixture was premixed using a Henschel mixer. The crude oxymethylene copolymer after premixing was introduced into a co-rotating twin screw extruder (inner diameter: 69 mm, L/D=31.5) from a hopper having an automatic quantitative feeder function at a rate of 60 kg/h, and the crude oxymethylene copolymer was melted at 220 to 230° C. and continuously introduced into a twin screw surface-renewal type horizontal kneader.

The solution level was controlled in a manner such that the residence time of the oxymethylene copolymer in the twin screw surface-renewal type horizontal reactor (effective inner volume: 60 L, which is a volume obtained by subtracting the volume occupied by stirring blades from the total inner volume) became 24 minutes, and while devolatilization was performed under a reduced pressure of 21.3 kPa at 220° C., the melted oxymethylene copolymer was continuously drawn out using a gear pump.

A strand of the melted resin continuously drawn out using the gear pump was immersed in a water bath for cooling and then fed to a pelletizer to be pelletized. The obtained pellet was dried by a hot-air dryer at 120° C. for 12 hours to obtain a final sample.

Example 12

An oxymethylene copolymer was obtained by a production method similar to that in Examples 1-11 and Comparative Examples 1-2, except that in the step 1, 300 parts by mass of 1,3-dioxolane was mixed relative to 100 parts by mass of the polymerization initiator (A) to obtain a mixture, which was mixed with the composition (B) containing trioxane to obtain the copolymer starting material (C).

Comparative Examples 2-4

A crude oxymethylene copolymer was obtained by carrying out the steps 1-3 in a manner similar to that in Example 1, except that the blending amounts described in Table 1 were employed using trioxane not containing triethanolamine and 1,3-dioxolane as the comonomer.

<Step 4: Stabilization Step>

To 100 parts by mass of the crude oxymethylene copolymer, 0.3 part by mass of ethylenebis(oxyethylene) bis[3-(5-tert-butyl-4-hydroxy-m-tolyl)propionate as a stabilizer (IRGANOX (registered trademark) 245, manufactured by BASF), 0.1 part by mass of melamine (manufactured by Mitsui Chemicals, Inc.), and 0.0002 part by mass of 2,5-bis (5'-t-butylbenzoxazol-2'-yl)thiophene as a fluorescent brightener (TINOPAL (registered trademark) OB, manufactured by BASF) were added, and the mixture was premixed using a Henschel mixer. The crude oxymethylene copolymer after premixing was fed to a twin screw extruder having a diameter of 30 mm by a screw feeder with a feed amount of 3 kg/h and heated so that the resin temperature became 250°

C. while being devolatilized under a reduced pressure of 21.3 kPa. After that, a strand of the melted resin discharged from the twin screw extruder was immersed in a water bath for cooling and then fed to a pelletizer to be pelletized. The obtained pellet was dried by a hot-air dryer at 120° C. for 12 hours to obtain a final sample.

The physical properties of the oxymethylene copolymer resin compositions of Examples and Comparative Examples were measured as described below. The evaluation results of the oxymethylene copolymer resin compositions of Examples and Comparative Examples are shown in Table 1.

<Polymer Content>

Polymer content (%)=(crude oxymethylene copolymer after removing unreacted monomer)/(crude oxymethylene copolymer before removing unreacted monomer)×100

When the polymer content is low, it means that the amount of the unreacted monomer is large and that the polymerization reaction has not sufficiently proceeded. The oxymethylene copolymer was washed twice with acetone in order to remove the unreacted monomer, and then acetone and the remaining unreacted monomer were vacuum dried using a vacuum dryer at 60° C. for 2 hours.

<Yield>

A numerical value obtained by: (a yield per hour (kg/h) of crude oxymethylene copolymer discharged after the pulverization step)×(the aforementioned polymer content)÷100 was regarded as a yield. The lower the polymer content is, the lower the yield is. Further, when the yield is low even though the polymer content is near 100%, it suggests that the monomer is volatilized by heat of reaction since the activity of the polymerization reaction is too high.

<Amount of Generation of Formaldehyde (HCHO)>

Regarding the amount of generation of formaldehyde, the amount of generation per 1 g of the oxymethylene copolymer resin (unit: μmol/g) was measured by the below-described procedure.

1) The oxymethylene copolymer resin composition was preliminarily dried at 80° C. for 3 hours and molded into a disk test piece having a diameter of 50 mm and a thickness of 3 mm using a molding machine SAV-30-30 manufactured by Sanjo at a cylinder temperature of 215° C.

2) On the day after the day on which molding was performed, using the obtained test piece, the amount of generation of formaldehyde was measured in accordance with the method described in Standard VDA275 of the German Automobile Industry Association (Automotive interior parts-Determination of the amount of formaldehyde emission by the revised flask method).

<Color Phase (b Value)>

The color phase of the test piece for measuring the amount of generation of formaldehyde was measured using a spectrocolorimeter (manufactured by Nippon Denshoku Industries Co., Ltd., SE-2000), and a b value as a measurement result was shown as a color phase of a molded article. The larger the b value is, the higher the yellowness is. Note that a b value at the plus side represents "yellowish" and a b value at the minus side represents "bluish".

TABLE 1

| | TOX Amount of TEA ×10⁻⁶ mol/ mol-TOX | All monomers Amount of TEA ×10⁻⁶ mol/mol- all monomers | Polymerization initiator Type | Addition amount ×10⁻⁶ mol/mol- all monomers | Effective polymerization initiator amount ×10⁻⁶ mol- all monomers | Polymerization terminator Addition amount mol/ mol-CA | Polymer content % | Yield % | Amount of generation of HCHO Residence 0 min ppm | Residence 5 min ppm | Residence 10 min ppm | Color phase (residence 0 min) b value |
|---|---|---|---|---|---|---|---|---|---|---|---|---|
| Example 1 | 0.05 | 0.048 | Perchloric acid | 0.15 | 0.10 | 530 | 96.7 | 82.7 | 2.5 | 7.8 | 9.2 | −3.1 |
| Example 2 | 0.20 | 0.191 | Perchloric acid | 0.33 | 0.14 | 150 | 94.2 | 82.3 | 3.0 | 8.6 | 9.3 | −3.1 |
| Example 3 | 0.20 | 0.191 | Perchloric acid | 0.33 | 0.14 | 300 | 93.5 | 81.7 | 2.4 | 8.5 | 9.3 | −2.9 |
| Example 4 | 0.20 | 0.191 | Perchloric acid | 0.33 | 0.14 | 530 | 94.8 | 82.8 | 2.7 | 6.6 | 7.5 | −2.7 |
| Example 5 | 0.20 | 0.191 | Perchloric acid | 0.30 | 0.10 | 530 | 91.4 | 80.6 | 2.7 | 7.0 | 7.5 | −3.6 |
| Example 6 | 0.20 | 0.191 | Perchloric acid | 0.33 | 0.14 | 530 | 93.8 | 74.5 | 2.6 | 7.6 | 8.5 | −3.0 |
| Example 7 | 0.20 | 0.191 | Perchloric acid | 0.37 | 0.18 | 530 | 96.6 | 73.3 | 2.6 | 8.7 | 10.1 | −2.5 |
| Example 8 | 0.09 | 0.086 | Perchloric acid | 0.19 | 0.10 | 530 | 95.2 | 82.6 | 5.0 | 12.6 | 14.2 | −3.5 |
| Example 9 | 0.09 | 0.086 | Perchloric acid | 0.19 | 0.10 | 1000 | 96.3 | 79.1 | 5.5 | 11.6 | 14.2 | −3.5 |
| Example 10 | 0.09 | 0.086 | Perchloric acid | 0.19 | 0.10 | 2000 | 95.9 | 82.1 | 4.4 | 9.5 | 12.1 | −3.6 |
| Example 11 | 0.25 | 0.238 | Perchloric acid | 0.38 | 0.14 | 530 | 94.0 | 81.2 | 4.1 | 9.5 | 11.7 | −2.6 |
| Example 12 | 0.19 | 0.181 | Perchloric acid | 0.30 | 0.11 | 1000 | 94.8 | 80.7 | 3.4 | 7.8 | 8.1 | −3.6 |
| Comparative Example 1 | 0.25 | 0.238 | Perchloric acid | 0.55 | 0.31 | 530 | 96.1 | 73.9 | 14.4 | 28.9 | 35.8 | −0.2 |
| Comparative Example 2 | 0.00 | 0.000 | Perchloric acid | 0.24 | 0.24 | 600 | 97.4 | 59.8 | 26.2 | 42.4 | 52.7 | −2.1 |
| Comparative Example 3 | 0.00 | 0.000 | Perchloric acid | 0.14 | 0.14 | 600 | 97.7 | 75.0 | 22.1 | 34.3 | 40.1 | −2.7 |
| Comparative Example 4 | 0.00 | 0.000 | Perchloric acid | 0.10 | 0.10 | 600 | 97.8 | 72.6 | 21.0 | 32.1 | 35.8 | −2.8 |

The invention claimed is:

1. A method for producing an oxymethylene copolymer, comprising:
preparing a polymerization initiator (A) containing perchloric acid or a derivative thereof;
subjecting a copolymer starting material (C) containing trioxane and a comonomer, the copolymer starting material (C) being obtained by mixing the prepared polymerization initiator (A) and a composition (B) containing the trioxane, to a polymerization reaction at 65° C. to 125° C.; and
adding a polymerization terminator (D) to a product obtained during the subjecting of the copolymer starting material (C) to the polymerization reaction at 65° C. to 125° C. to obtain a crude oxymethylene copolymer, wherein:
the copolymer starting material (C) contains triethanolamine in an amount of $0.048 \times 10^{-6}$ mol to $0.25 \times 10^{-6}$ mol relative to 1 mol of all monomers that are the total of the trioxane and comonomer; and
when the difference between the amount X of perchloric acid per 1 mol of all the monomers (mol/mol) and the amount Y of triethanolamine per 1 mol of all the monomers (mol/mol) is regarded as an effective polymerization initiator amount Z (mol/mol) and defined by formula (1) below, the effective polymerization initiator amount Z in the copolymer starting material (C) is from greater than 0 to $0.2 \times 10^{-6}$ $$Z = X - Y \quad (1).$$

2. The method according to claim 1, wherein the polymerization initiator (A) contains a comonomer.

3. The method according to claim 1, wherein the composition (B) contains a comonomer.

4. The method according to claim 1, wherein the polymerization initiator (A) contains an organic solvent.

5. The method according to claim 1, wherein the concentration of the perchloric acid or derivative thereof in the polymerization initiator (A) is $1.0 \times 10^{-3}$ mol/kg to $1.0 \times 10^{-2}$ mol/kg.

6. The method according to claim 1, wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal and 1,6-hexanediol formal.

7. The method according to claim 1, wherein the polymerization terminator (D) is at least one selected from the group consisting of a trivalent organophosphorous compound, an amine compound, and a hydroxide of an alkali metal or an alkaline earth metal.

8. The method according to claim 1, further comprising adding an antioxidant and a base to the obtained crude oxymethylene copolymer and melt-kneaded.

9. A method for producing an oxymethylene copolymer, comprising:
preparing a polymerization initiator (A) containing perchloric acid or a derivative thereof;
subjecting a copolymer starting material (C) containing trioxane and a comonomer, the copolymer starting material (C) being obtained by mixing the prepared polymerization initiator (A) and a composition (B) containing the trioxane, to a polymerization reaction at 65° C. to 125° C.; and
adding a polymerization terminator (D) to a product obtained during the subjecting of the copolymer starting material (C) to the polymerization reaction at 65° C. to 125° C. to obtain a crude oxymethylene copolymer, wherein:
the copolymer starting material (C) contains triethanolamine in an amount of $1.0 \times 10^{-8}$ mol to $3.0 \times 10^{-7}$ mol relative to 1 mol of the trioxane; and
when the difference between the amount X of perchloric acid per 1 mol of all monomers (mol/mol) and the amount Y of triethanolamine per 1 mol of all the monomers (mol/mol) is regarded as an effective polymerization initiator amount Z (mol/mol) and defined by formula (1) below, the effective polymerization initiator amount Z in the copolymer starting material (C) is from greater than 0 to $0.2 \times 10^{-6}$ $$Z = X - Y \quad (1).$$

* * * * *